(12) United States Patent
Rahman

(10) Patent No.: US 11,057,736 B2
(45) Date of Patent: Jul. 6, 2021

(54) RADIO SIGNAL QUALITY PATTERN MAPPING IN GEO SPACE TO PROVIDE GUIDED LOCATION ALIGNMENT INDICATION TO USER EQUIPMENT

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/383,401

(22) Filed: Apr. 12, 2019

(65) Prior Publication Data

US 2020/0329340 A1 Oct. 15, 2020

(51) Int. Cl.
*H04W 4/024* (2018.01)
*H04B 17/318* (2015.01)
*H04W 24/08* (2009.01)
*H04W 84/04* (2009.01)

(52) U.S. Cl.
CPC .......... *H04W 4/024* (2018.02); *H04B 17/318* (2015.01); *H04W 24/08* (2013.01); *H04W 84/042* (2013.01)

(58) Field of Classification Search
CPC ... H04W 4/024; H04W 24/08; H04W 84/042; H04B 17/318; H04B 17/23; H04B 17/382

USPC ...................................................... 455/456.1
See application file for complete search history.

(56) References Cited

U.S. PATENT DOCUMENTS

| | | | |
|---|---|---|---|
| 2013/0035109 A1* | 2/2013 | Tsruya .................. | G01S 5/0252 455/456.1 |
| 2016/0127209 A1* | 5/2016 | Singh .................... | H04W 24/10 455/435.2 |
| 2016/0277939 A1* | 9/2016 | Bertrand ............... | H04W 16/18 |
| 2017/0215093 A1* | 7/2017 | Zhang ................... | H04W 4/024 |

* cited by examiner

*Primary Examiner* — Farid Seyedvosoghi
(74) *Attorney, Agent, or Firm* — Lee & Hayes, P.C.

(57) ABSTRACT

Processes and systems for determining perceived signal strength indicator values of a cellular signal transmitted by a base station within a coverage region are discussed herein. In one example, user equipment measures signal strength indicator values for a cellular signal in a coverage region. A base station receives the signal strength indicator values measured by the user equipment and generates a signal strength indicator map using the received values and respective locations of the user equipment that measured the received values. Data indicative of the signal strength indicator map is transmitted to user equipment to guide users of user equipment to move to a region in the coverage region that has a greater perceived signal strength indicator for the cellular signal.

19 Claims, 9 Drawing Sheets

RADIO SIGNAL QUALITY PATTERN MAPPING IN GEO SPACE TO PROVIDE GUIDED LOCATION ALIGNMENT INDICATION TO USER EQUIPMENT

BACKGROUND

Cellular signals are transmitted from a transmitter such as a cell tower in a base station as propagating electromagnetic waves. The strength or intensity of a propagating cellular signal wave does not remain constant, but in general attenuates with the distance between a cellular device and a base station (or cellular tower). In other words, the strength of a cellular signal decreases or attenuates as the cellular wave propagates away from the cell signal transmitter. The signal strength of a cell signal is typically described in terms of dBm units. A limited amount of cell signal attenuation may occur without adversely affecting the voice and/or data communication of a user equipment, but eventually a cell signal degrades to a sufficiently low level the call quality is unacceptable.

Other factors besides distance attenuate the strength of a cell signal. For example, obstructions such as trees and buildings and other obstructions may absorb and/or reflect the incident cellular wave, thereby reducing the strength of the cellular signal received by a user equipment. Additionally, conductive materials may reflect and/or absorb the cellular signals, thereby interfering with the transmission of cellular signals. Interior architectures, including walls, may also interfere with the transmission of cellular signals. As a result, the cellular signals received by user equipment may exhibit variations that are different than expected from attenuation due to distance from the transmitter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
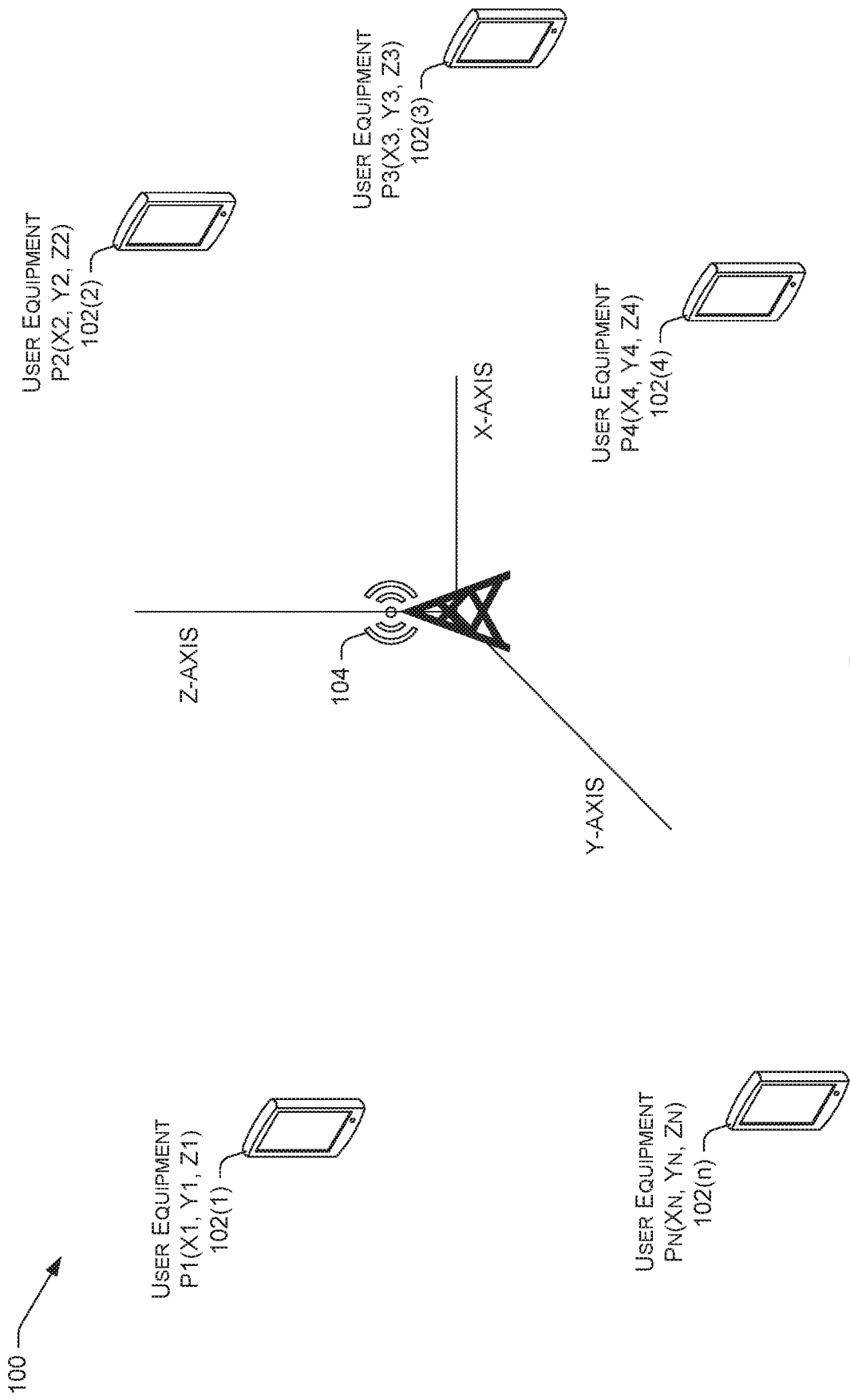
FIG. 1 is an illustrative environment depicting multiple user equipment in a coverage area for a base station. One or more of the multiple user equipment determine a received signal strength of the cellular signal from the base station and provide information related to the determined signal strength to the base station.

Described herein are systems and methods to map measured or perceived signal strength indicator values for a cellular signal over a cellular coverage area. In an example, one or more user equipment receive a cellular signal transmitted from a base station and generate signal strength indicator values for the received cellular signals. One or more user equipment transmit the measured signal strength indicator values to a base station. The base station may include information and/or functionality indicating the location of the respective user equipment. Alternatively, a user equipment may determine its location and send location information to the base station. Using the location information and respective received signal strength values for user equipment in a coverage area of a base station, the base station may generate a signal strength indicator map indicating, at a plurality of geographic coordinates, the strength of the signal received at individual geographic coordinates.

The perceived signal quality indicator maps identify geographic areas of perceived or measured signal strength of a cellular signal. These signal quality indicator maps may illustrate various regions of different signal qualities, and therefore may provide guided location alignment to advise users of user equipment to move to a different location having a better signal quality than the current location. For example, a user equipment located in a region of poor signal quality may experience poor or unacceptable connection for voice and/or data communication. The perceived signal quality indicator map may provide advice or guidance to a user of a user equipment to move to a region having better signal strength or quality to allow a user to regain voice and/or data service. The perceived signal quality map may provide detailed information regarding perceived or measured cellular signal within a fine granular region covering both indoor and outdoor regions. The map may be updated in real time as the user equipment send its measured perceived signal qualities to the base station. For purposes of this disclosure, a base station and a base station serving node may be used interchangeably.

The user equipment may receive the map of signal strength indicator values from the base station and display that map on the display screen of the user equipment. In an example, the user may receive data indicating the signal strength indicator values as a function of two-dimensional or three-dimensional space. The user equipment may also include an application installed on the user equipment to display a map of signal strength indicator values based on the received data. The signal strength indicator map provides real-time and intuitive feedback for guiding customers to regions having a better reception of cellular signals. For example, information obtained from the signal strength indicator map may be used to advise a user to move an approximate distance or to an approximate region to obtain better service for voice and/or data communications. The signal strength indicator map may provide a priori intelligence or information that guides users to regions having an enhanced cell phone signal quality.

In one example, the base station may determine the relative distance of the user equipment connected to the base station. The user equipment connected to the cellular network provided by the base station may determine the signal quality of the received cellular signal and transmit the determined signal quality to the base station. The base station collects the received signal quality (or signal intensity) measurements from numerous user equipment located in various locations around the base station. In conjunction with the respective locations associated with the user equipment that measured the signal strength indicator values, the base station creates a mapping of the perceived cellular signal strength as a function of geometric space around the base station.

Signal strength or quality of the cellular signal transmitted from a base station is a function of many parameters, including the relative distance from a cell tower, environment factors, and the strength of cellular signal emitted from the cell tower. For example, the cell signal is transmitted as an electromagnetic wave that attenuates as the wave propagates away from the base station. Buildings, other structures, and trees, for example, may reflect or absorb some of the power of the cellular signal, thereby affecting the strength of cellular signal propagating away from a base station. Moreover, interior environmental factors, including walls and furniture, types of materials, and other obstructions, may further attenuate the cellular signal before reception by a user equipment.

The disclosed systems and methods provide a real-time estimation of the signal strength of the cellular signal received by a user equipment located in a region of cell coverage provided by a base station. Generating a map of the perceived signal strength indicator values of the cellular signal received by user equipment at physical locations relative to a cell tower permits mapping of relative signal strength indicator values of the cellular signal. This mapping information may identify locations or regions of enhanced cellular signal strength, thereby guiding a user to travel toward such a region to enhance the quality of the current call or data connection.

In one example, the system includes one or more user equipment and a cell tower or base station. During operation, a user equipment measures the signal strength of the received signal and transmits that measured signal strength indicator value to the base station. The user equipment may also transmit information related to its location to the base station. In an example, the base station may determine the location of the user equipment. After receiving the measured signal strength indicator values from user equipment at respective locations, the base station may create or update a signal strength indicator table for a base station. In an example, the rows of a signal strength indicator table may include the locations the user equipment and the respective signal strength values measured by the user equipment at those device locations. The signal strength indicator table may also include the frequency range of the respective user equipment that provided the measured signal strength indicator values.

One or more user equipment may be serviced by a network service provider. The network service provider may maintain a base station (e.g., cell tower) to wirelessly transmit the cell signal. User equipment may receive the cellular signal via an antenna in the user equipment. Each user equipment may measure the signal strength indicator of the received cell signal. For purposes of this disclosure, the signal quality, signal intensity, and signal strength may be used interchangeably. The user equipment may transmit the measured signal strength indicator values to a base station in a periodic measurement report. A user equipment may send the measured signal strength indicator values to the base station in response to various events, including when the measured signal strength of a neighboring base station exceeds the measured signal strength of the base station the user equipment is currently connected to.

Each base station may receive measurement reports from user equipment that include signal strength indicator values measured by user equipment. The measured signal strength indicator values and the locations of the user equipment when making those measurements may be used to generate a map of received signal strength indicator values at respective locations. The map may include measured signal strength indicator values as a function of position relative to a cell tower. This map may be displayed in the form of a two- or three-dimensional map. The map may be transferred as data to a user equipment, and the user equipment may thereafter display the data as a two- or three-dimensional map. In an example, the map may consist of a three-dimensional map of measured signal strengths as a function of position relative to a cell tower. To determine the respective location of a user equipment, the base station may receive from the respective location coordinates of the user equipment, along with a report including the signal strengths, from a user equipment. The base station may also determine the location, based in part, on a time alignment procedure the base station performs for each user equipment.

In an example, a user equipment determines a received signal strength indicator of the cell signal by measuring a reference signal received power (RSRP) value of the cell signal. The measured RSRP value estimates the power of the LTE reference signals spread over the full bandwidth and narrowband of the cell signal. Other example received signal strength indicator measurements include received signal strength indicator (RSSI) and a reference signal received quality (RSRQ). By way of another example, the measurements may include a signal-to-interference-plus-noise ratio (SINR) associated with one or more of a received 4G or 5G signal.

A user equipment may determine its location in several ways. A user equipment may determine its location using a Global Positioning System (GPS) based on a GPS chip in the user equipment. The user equipment may determine its location based on signals and locations of neighboring WiFi access points. In another example, a user equipment may determine its location using the Observed Time Difference of Arrival (OTDOA) approach. OTDOA compares a phase reference with phase reference signals of neighboring base stations to determine the location of a user equipment. OTDOA is an example of a multilateration method in which a user equipment measures time differences between signals received from several base stations, eNodeBs, or gNodeBs to determine its location.

The base station may also calculate the location of a user equipment based upon the measured timing advance values and the height of the cell tower. The timing advance value may be calculated by the base station and represents the time for the cellular signal to propagate from the cell tower to the user equipment. Accordingly, the timing advance value can be converted into a displacement distance from the cell tower to determine the location of the user equipment relative to the cell tower.

The disclosed systems and methods include processes that determine received signal strength indicator values as a function of distance from a cell tower. The processes may create a mapping of the received signal indicator values in two- or three-dimensional space surrounding a base station. The signal strength indicator map or its information may be transmitted to user equipment. The map (or its information) and the location of the user equipment may be displayed on a display screen of a user equipment. The displayed signal strength indicator map illustrates regions of perceived signal intensities to the user allowing the user to move to a region to obtain better cell service. In an example, the user equipment may display a location, along with directions directing a user to that location, at which a user may obtain better cell service.

In some examples, user equipment may operate in various frequency ranges (e.g., 4G or 5G band(s) 2, 4, 66, 5, 12, and 17, Citizens Broadband Radio Service (CBRS), and the like) or communication protocols (e.g., 4G, 4G LTE, 5G, and the like). In this case, a signal strength indicator map may be created from a subset of user equipment in which the user equipment use the same frequency range and/or communication protocols when communicating with the base station. Mapping the measured signal intensities for a range of frequencies may be may identify frequency-specific variations in the signal strength indicator maps that may be of interest for user equipment of a specific frequency.

FIG. 1 depicts an example environment 100 for mapping signal strength indicator values of a cell signal propagating from a base station as a function of location relative to the base station. FIG. 1 depicts n user equipment 102(1), 102(2), 102(3), 103(4), and 102(n) that each have measured a respective signal strength indicator P. User equipment 102(1) is located at position (X1, Y1, Z1) relative to base station 104, and measured a signal strength indicator of P1. Similarly, user equipment 102(2) is located at position (X2, Y2, Z2) relative to base station 104 and measured a signal strength indicator of P2, user equipment 102(3) is located at position (X3, Y3, Z3) relative to base station 104 and measured a signal strength indicator of P3, user equipment 102(4) is located at position (X4, Y4, Z4) relative to base station 104 and measured a signal strength indicator of P4, and user equipment Pn is located at position (Xn, Yn, Zn) relative to base station 104 and measured a signal strength indicator of Pn.

The user equipment in FIG. 1 may be located at any position relative to base station 104. The user equipment in FIG. 1 may periodically send signal strength indicator values and may optionally send location information to base station 104. The user equipment in FIG. 1 are mobile and may measure the signal strength indicator values at various points around the base station 104 to generate data for a signal strength indicator map for base station 104.

Figure 2:
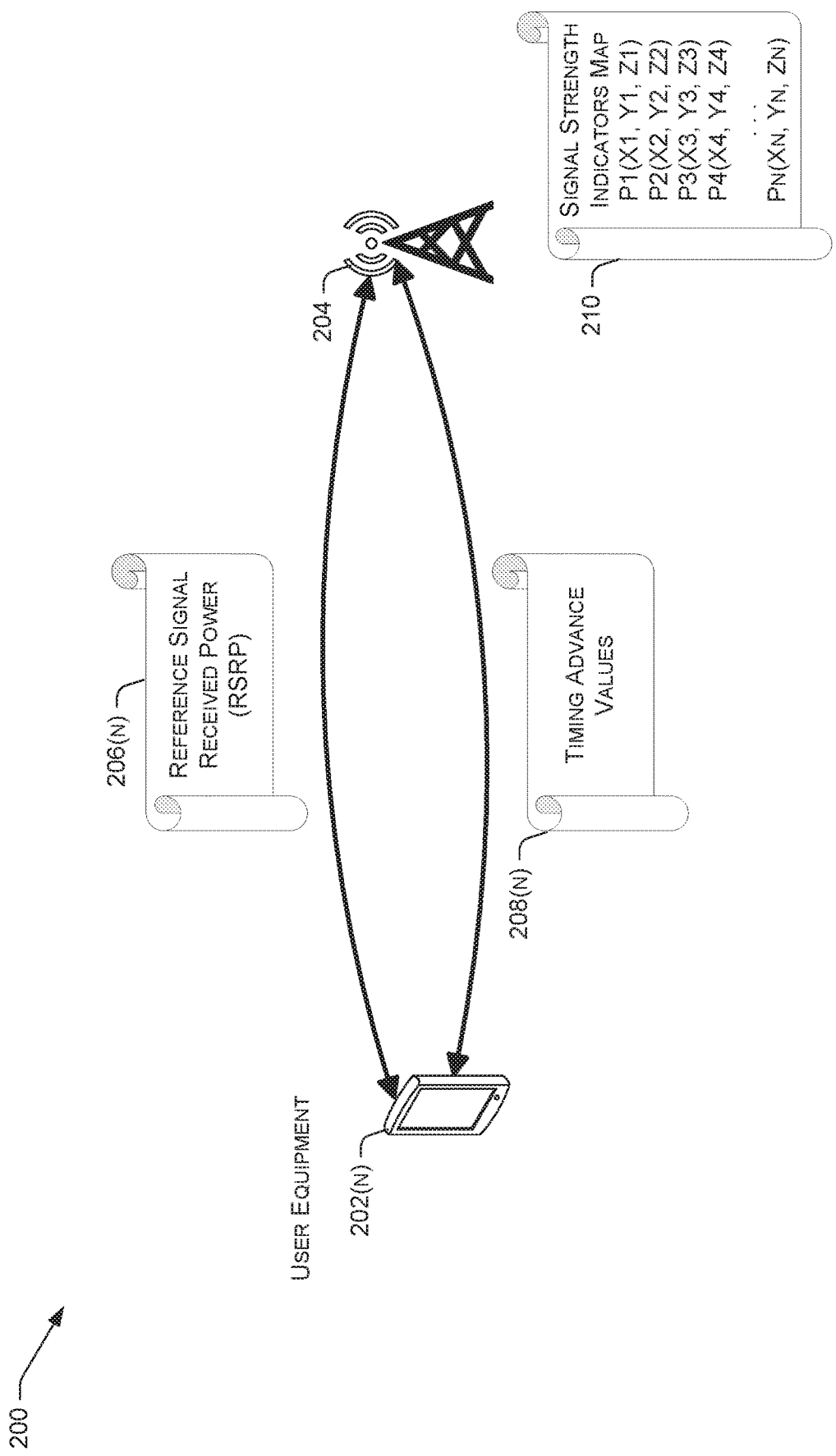
FIG. 2 illustrates an example data transfer between a user equipment and a base station. In this figure, the user equipment transfers a reference signal received power (RSRP) value to the base station. The base station transfers a timing advance value to the user equipment so that the user equipment may time align the transmission and reception of data encoded in the cellular signals. A timing advance value is an example of timing advance information for use by a user equipment to time align transmission and reception.

FIG. 2 depicts some of the information exchanged between user equipment 202(n) and base station 204. In this case, user equipment receives a cell signal from base station 204. After reception of the cell signal, user equipment shown in FIG. 2 determines a reference signal received power (RSRP). The RSRP value is an estimate of the received signal strength of the cell signal. In an example, the user equipment determines an RSSI value as an estimate of the received signal strength. In an example, the user equipment determines an RSRQ value as an estimate of the received signal strength. The user equipment may measure any parameter of the received signal as an estimate of the received signal strength.

The user equipment 202(n) may periodically send a measurement report to base station 204. The measurement report includes information related to the user equipment 202(n). In one example, user equipment 202(n) transmits a report 206(n) to base station 204. The report 206(n) may include the measured RSRP value as an example measurement of the determined cell signal strength indicator value measured by the user equipment 202(n). The RSRP value is an example estimation of the power in the LTE signal received by user equipment 202(n). The user equipment 202(n) may periodically send the measurement report 206(n) to the base station 204. The report 206(n) may be sent to base station 204 at a repetitive time interval, such as every 500 milliseconds, every 2 seconds, every 10 seconds, and the like.

In an example, the user equipment may send the report 206(n) after the occurrence of a triggering event. One example triggering event is the occurrence of the received signal strength from a neighboring base station becoming less than the received signal strength from the base station 204 to which the user equipment 202(n) is currently connected.

In an example, the report 206(n) may be transmitted to base station 204 upon the occurrence of event A1, which is triggered when the signal strength of the serving cell exceeds a threshold. Other LTE triggering events include A2, A3, A4, A5, B1, and B2. Event A2 occurs when the signal strength of the serving cell is less than a threshold. Event A3 is triggered when the signal strength of a neighboring cell exceeds the signal strength of the serving cell by an offset. Event A4 occurs when the signal strength of a neighboring cell exceeds a threshold. Event A5 is triggered when the signal strength of the serving cell is less than a first threshold, while the signal strength of a neighboring cell exceeds a second threshold. Event B1 occurs when the signal strength of a neighboring inter-system cell exceeds a threshold. Event B2 is triggered when the signal strength of the serving cell is less than a first threshold, while the signal strength of a neighboring inter-system cell exceeds the second threshold.

Because the cell signals propagate as an electromagnetic wave with a known velocity and because user equipment may be located at any distance from a serving base station, a serving base station determines and transmits timing information to user equipment. One example timing information are timing advance values. The timing advance values determine how much a user equipment should advance or delay is reception or transmission of the cellular signal so that the data receipt or transmission occurs during the appropriate time interval. The timing advance values recognize that the cellular signal propagates at a specific velocity, namely the speed of light. In one example, the timing advance value approximates the time required for a for an electromagnetic wave to travel the distance between the base station 204 and user equipment 202(n), taking into account the speed of the cellular signal propagation. The timing advance value approximates the propagation delay for both the uplink and the downlink directions.

Upon receiving the measured RSRP values from user equipment, the base station may create, or update, a signal strength indicator map 210. When the measurement report is transmitted to the base station 204, the base station 204 may extract an RSRP value from the report 206(n) and map that measured RSRP value to the location (Xn, Yn, Zn) of the user equipment 202(n), generating a signal strength indicator map 210 as a function of distance from base station 204. The signal strength indicator map includes data taken by numerous user equipment connected to base station 204. In one example, the signal strength indicator map 210 includes ordered pairs Pn(Xn, Yn, Zn), wherein the received signal strength indicator Pn is measured at geographic location (Xn, Yn, Zn). The signal strength indicator map 210 may be updated with the additional received signal strength values such as RSRP values from various user equipment in the coverage region of the base station 204. In one example, the base station 204 may receive measurement reports from various user equipment over a period of time, such as 10-30 minutes for use in generating the signal strength indicator map.

The location (Xn, Yn, Zn) of user equipment 202(n) may be determined in several ways. In one example, the user equipment may determine its absolute location based on using its GPS functionality. The GPS location information may be sent to the base station 204, and the base station 204 may use that information to determine the position of the user equipment 202(n) relative to the base station 204. In another example, the user equipment 202(n) may determine its position relative to the base station 204.

In another example, the user equipment 202(n) may determine its location using the Observed Time Difference of Arrival (OTDOA) method. The OTDOA method is a multilateration method in which a respective user equipment measures the times of arrival (TOAs) of signals received from neighboring base stations. The TOAs received from multiple neighboring base stations are offset from a TOA of a reference signal from a base station to form Observed Time Difference of Arrivals (OTDOAs). In one example, the user equipment may use the reference signal time difference (RSTD) measurement to determine the time differences. Based on these measurements, the user equipment may determine its geographic position relative to base station 204. In one example, the measurements taken during the OTDOA method may be transmitted to base station 204 as part of the data in the measurement report.

In an example, the base station 204 determines timing advance values for user equipment 202. Based on the timing advance values, the radial distance and from the cell tower of the base station to a respective user equipment may be determined, along with the geographic coordinates relative to the base station using known geometric and trigonometric relationships.

Figure 3:
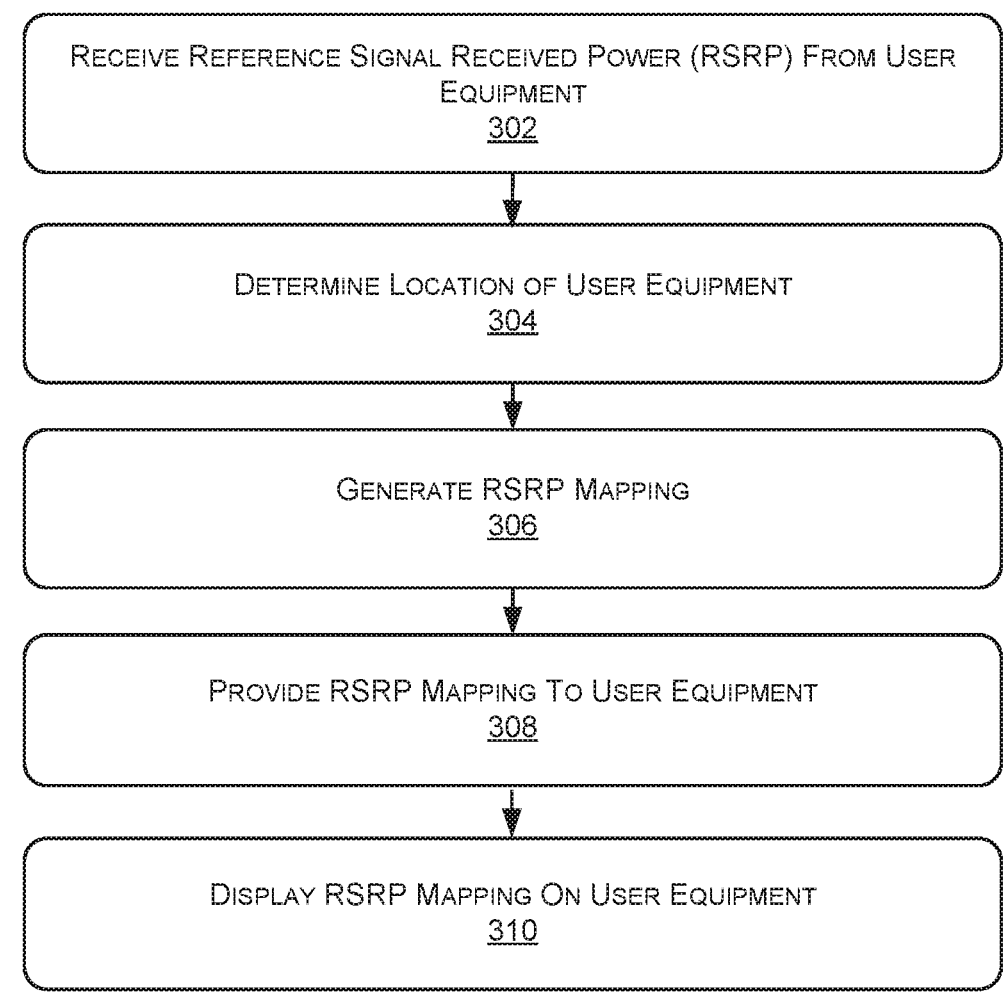
FIG. 3 illustrates an example process for generating a perceived signal strength map. The user equipment in the coverage area of a base station determine the signal intensity of the received cell signal (e.g., the user equipment measures the reference signal received power (RSRP) value of the cellular signal). A two- or three-dimensional map is generated based on the RSRP values measured by each user equipment and the location information for each user equipment when making those RSRP measurements. These maps represent a graph in which the measured RSRP values is represented in two- or three-dimensional space.

FIG. 3 depicts an example process 300 for determining a map of received signal intensities for a base station over a geometric region. The process begins at block 302 in which the signal strength indicator values measured by a user equipment are received by the base station. In one example, a measured reference signal received power (RSRP) values are provided by the respective user equipment to the base station. In another example, the RSSI values are provided by the respective user equipment to the base station. In an example, the RSRQ values are provided by the respective user equipment to the base station. In an example, one or more of the RSRP, RSSI, and RSRQ values are provided by the user equipment to the base station.

In block 304, the location of the user equipment that transmitted the signal strength indicator values to the base station is determined. The location of the user equipment may be determined using various methods. The user equipment may send GPS location coordinates to the base station for the base station to determine the location of the user equipment relative to the base station. The user equipment may send to the base station a coordinate position relative to the position of the base station. In another example, the base station uses the absolute coordinates of the base station and the user equipment to determine the position of the user equipment.

In another example, the position of the user equipment is determined using the OTDOA method. The user equipment may apply a multilateration method to signals from neighboring base stations to determine the position of the user equipment. In an example, the base station may use OTDOA to determine the position of the user equipment.

In block 306, the base station generates a mapping of the received signal strength indicator values to geographic space using the geographic coordinates of the user equipment and the respective signal strength indicator values. The mapping may be updated as additional signal strength indicator data is provided by a user equipment to the base station. For example, as additional user equipment connects to a base station, the measured signal strength indicator values, along with the location of the respective user equipment are added to the signal strength indicator map. Additionally, a user equipment may periodically transmit signal strength indicator values in the measurement reports transmitted to the base station. In this fashion, a map of signal intensities over geographical space may be efficiently generated and updated over time.

In block 308, data related to the signal strength indicator map is provided to user equipment. In an example, the signal strength indicator map generated by the base station may be transmitted to user equipment. This map may be transmitted in various formats, including PDF, a Visio file, a photoshop file, or any other file type that may be displayed on a user equipment. In an example, data corresponding to signal strength indicator values as a function of distance from the base station, rather than the generated signal strength indicator map, may be provided to user equipment.

In block 310 the signal strength indicator map (or data) received from the base station may be displayed on user equipment. The map may be displayed in various formats, including PDF, Visio, and power point. In an example, the user equipment may generate a map showing the signal strength values as a function of geographic coordinates. An application installed on the user equipment may be used to display and/or analyze the map. The map may also be displayed using function or procedure calls to the operating system.

The signal strength indicator map displayed on the user equipment may contain an icon or other marker indicating the current location of the user equipment. The icon permits a quick and efficient way to represent the location of the user equipment. The icon may move in geometric space as the user moves in real space. The icon representing the user equipment may be overlaid on a geographic map showing the surrounding area and environment on the user equipment. The icon representing the user equipment may also be overlaid on an image representing the signal strength indicator values measured by the user equipment. By analyzing the map of signal strength indictors, a user of the user equipment may select a region to move toward to enhance the voice and/or video quality of a communication. A user may quickly scan the signal strength indicator map to determine an appropriate location to obtain stronger cell coverage for a voice and/or data connection.

Figure 4:
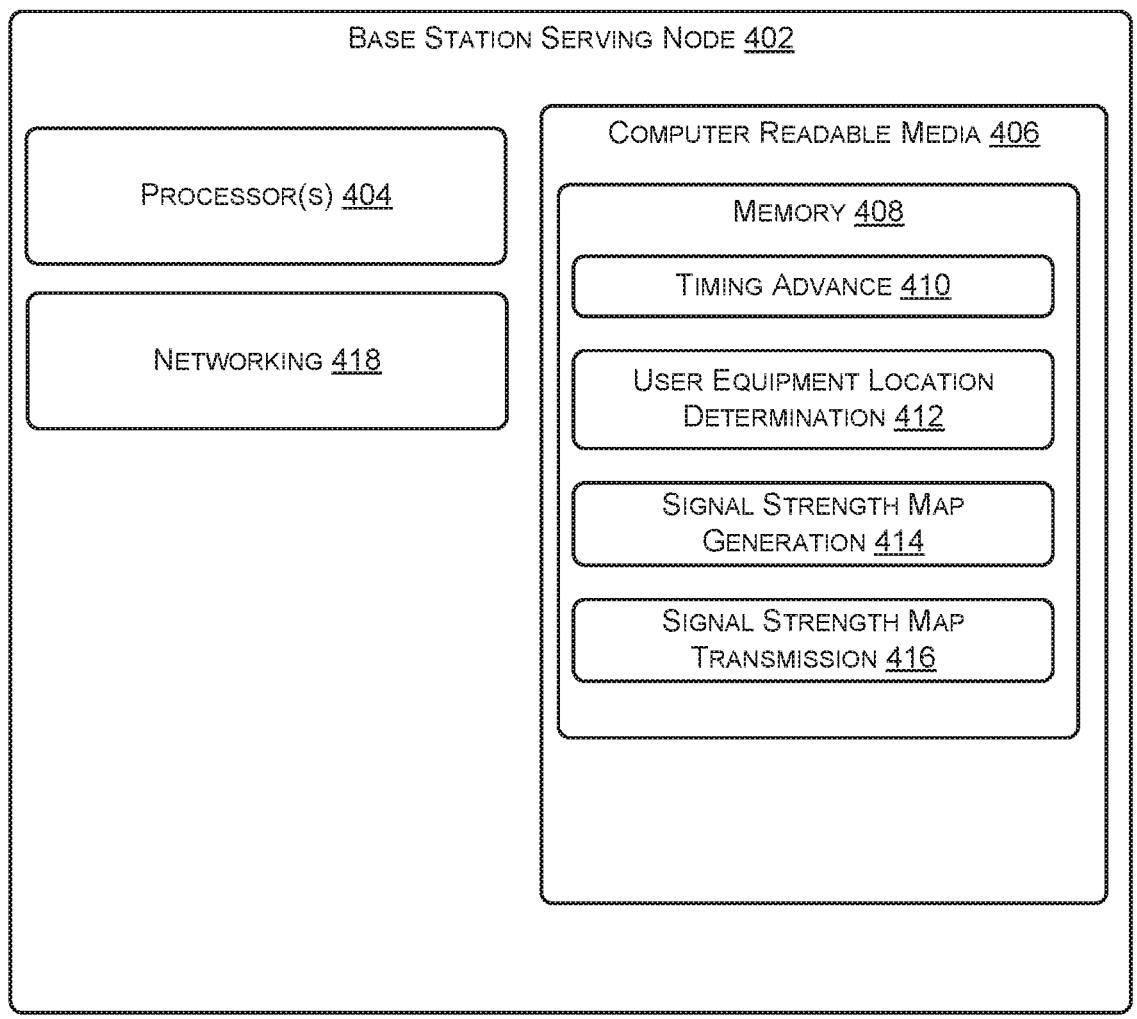
FIG. 4 illustrates example hardware and software for an example base station serving node according to the disclosed systems and methods.

FIG. 4 depicts example hardware and software of an example base station serving node 402. The base station serving node 402 includes one or more processors 404 and a computer readable media 406. The computer readable media 406 includes memory 408. Memory 408 stores computer instructions that when executed cause the one or more processors of the base station serving node 402 to perform various operations for generation of a signal strength indicator map.

Base station serving node 402 includes one or more processors 404 and a computer readable media 406. The computer readable media 406 includes instructions that when executed by one or more processors 404 perform the functions of a base station serving node 402 to generate a map of measured signal strength values in a geographic region served by base station serving node 402.

Example computer readable media 406 include RAM, ROM, firmware, flash memory, EEPROM, or other types of memory storage known to one of ordinary skill in the art. Tangible computer-readable media may include volatile and nonvolatile, removable and non-removable media implemented in any method or technology for storage of information, such as computer readable instructions, data structures, program components, or other data. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the processors 404 of the base station serving node 402. Any such tangible computer-readable media can be part of the base station serving node 402.

Block 410 includes computer instructions that when executed by one or more processors determine the timing advance values to be sent to user equipment. The timing advance values represent the amount of time that a user station would advance or delay its reception or transmission. The timing advance values facilitate a user equipment to receive or transmit during the appropriate slot for the cellular signal.

Block 412 includes computer instructions that when executed by one or more processors determine the location of user equipment. The user equipment location may be determined based in part on the respective timing advance value determined at block 410. The timing advance value, combined with additional parameters such as the height of the transmitter for a base station serving node, physical co-ordinates of a base station and relative distance of the user equipment from a base station through standard 3GPP time alignment mechanisms, are to be used in conjunction with trigonometric relationships to determine the location of each user equipment connected to a base station. In an example, the user equipment location determination component may be optional.

Block 416 includes computer instructions that when executed by one or more processors generate a perceived signal strength map for the cellular signal transmitted by the base station serving node 402. In one example, the map may comprise a table or other data structure associating the measured signal strength indicator values with a geometric spatial coordinate. The measured signal strength indicator values may be received from user equipment as part of a measurement report. The location of the user equipment may be received by a respective user equipment. The location of the user equipment may be determined by the user equipment location determination component 412 of the base station serving node 402. In an example, the map may be a graphical representation of the table including the perceived signal strength indicator values Block 416 includes computer instructions that when executed by one or more processors transmit the perceived signal strength map to user equipment. In one example, the perceived signal strength map may be transmitted as a graphical file. In an example, the data stored in the signal strength map table may be transmitted to user equipment for the user equipment to generate and display the map. In an example, based on the location of the user device, the signal strength map transmission component 416 may transmit data representing the suggested location for the user equipment to obtain a cellular signal of enhanced signal strength to maintain sufficient voice or data communication quality.

The base station serving node 402 may include networking component 418 for providing ports and components for communicating with the other elements of the system such as that shown in FIG. 1. The networking component 418 may include transceiver ports for local area networks (LANs) and wide area networks (WANs). In one example, the LAN and/or WAN ports provide a wired connection to an Intranet and/or Internet. The networking component may also provide connections to other components of the carrier's base station, as well as to the back-end system of the carrier. The networking component 418 may also include a wireless communications component that includes one or more wireless transceivers. For example, the transceivers can include a network interface card (NIC), a network adapter, a LAN adapter, or a physical, virtual, or logical address to connect to various network(s), or to the back-end system of the carrier's network, for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers can also include other wireless modems, such as a modem for engaging in Wi-Fi, WiMax, Bluetooth, or infrared communication.

Figure 5:
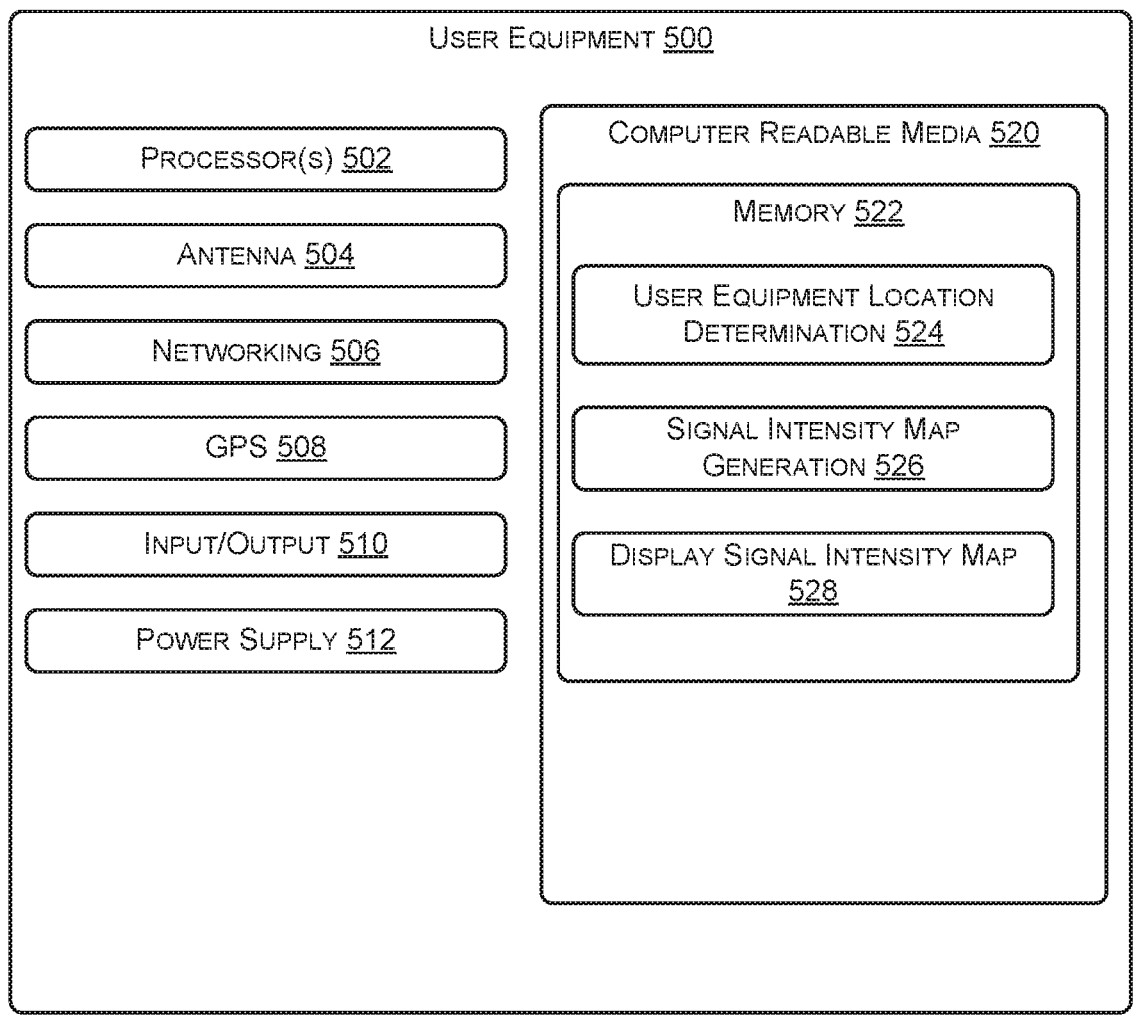
FIG. 5 illustrates example hardware and software for an example user equipment accordingly to the disclosed systems and methods.

FIG. 5 illustrates an example user equipment for use with the disclosed systems and methods. In this example, the user equipment 500 includes a processor 502, an antenna 504, networking component 506, GPS 508, input/output ports 510, power supply 512, and a computer readable media 520. The computer readable media 520 includes a memory 522 that stores instructions for user equipment location determination 524, signal strength indicator map generation 526, and display of the signal strength indicator map 528.

The user equipment 500 includes one or more processors 502. Processor(s) 502 may be any type of processors, including a central processing unit (CPU), a graphics processing unit (GPU), or both CPU and GPU, or other processing unit or component known in the art.

The antenna 504 provides radio frequency (RF) communications with a licensed cellular network, such as a 5G/NR network, an LTE network, a UTMS network, or a GSM network. The networking component 506 may include ports and modules for communicating with the outside world. The networking component 506 includes transceiver ports for local area networks (LANs) and wide area networks (WANs). In one example, the LAN and/or WAN ports provide a wired connection to the Internet. The networking component 506 may also include a wireless communications module that includes one or more wireless transceivers to wirelessly transmit and receive data. For example, the transceivers can include a network interface card (NIC), a network adapter, a LAN adapter, or a physical, virtual, or logical address to connect to various network(s), for example. To increase throughput for exchanging wireless data, the transceivers may utilize multiple-input/multiple-output (MIMO) technology or other high throughput wireless standards such as 802.11ac. The transceivers may comprise any type of wireless transceivers capable of engaging in wireless, radio frequency (RF) communication. The transceivers are not limited to 802.11 ac, but may include one or more modems for engaging in IEEE 802.11-based technologies, IEEE 802.15-based technologies and its progeny (e.g., Zigbee, Bluetooth, Low-Rate Wireless Personal Area Networks, Wireless HART, MiWi), IEEE 806.15-based technologies (WiMAX), WLAN, near-field communications, and infrared communications.

The GPS 508 provides global positioning data for the user equipment. Input/output (I/O) ports 510 provide interfacing with the external environment. The I/O ports may include USB, serial, parallel, HDMI, display ports, digital video interface (DVI), Ethernet, and any other ports known to a person of ordinary skill in the art. These input/out ports may collectively be referred to as I/O 510. The I/O ports interface with device(s), such as a keypad, a cursor control, a touch-sensitive display, voice input device, etc., a display, speakers, printers, etc. These ports are well known in the art and need not be discussed at length here.

The user equipment 500 also includes power supply 512 for providing AC and/or DC power for the user equipment. In an example, the power supply 512 is a battery. In an example, the power supply 512 includes an AC adaptor or a DC adaptor with a backup power supply such as a backup battery.

The user equipment 500 includes computer-readable media 520. As an example, the computer-readable media 520 includes memory 522 (or other storage components) for storing computer executable instructions that perform the disclosed systems and methods. Computer readable media may include any type of memory or storage media for a processor, including RAM, ROM, firmware, flash memory, EEPROM, or other types of memory known to one of ordinary skill in the art. One component of computer readable media 520 is a user equipment location determination component 524, which provides the executable code for the user equipment 500 to determine its location. Tangible computer-readable media can include volatile and nonvolatile, removable and non-removable media implemented in any method or technology for storage of information, such as computer readable instructions, data structures, program modules, or other data. In an example, computer readable media may include hard disk drives for storing the instructions for the user equipment location determination component 524. Other computer readable media may include magnetic disks, optical disks, or tape, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user equipment 500. Any such tangible computer-readable media may be included in user equipment 500.

As previously mentioned, the computer readable media 520 includes the user equipment location determination component 524 that performs logic to determine the location of the user equipment 500. The user equipment location determination component 524 includes executable computer instructions that when executed on a processor cause a user equipment to determine its location. In an example, the user equipment location determination component determines its location using the GPS component 508. In an example, the user equipment may determine its location using an Observed Time Difference of Arrival (OTDOA) method. In an example, the user equipment may determine its location based on combination of GPS and OTDOA.

The user equipment 500 may also include a signal strength indicator map generation component 526. In one example, the user equipment receives data from a base station. The data may include ordered pairs of data, for example, values of individual measured signal strength indicator values along with respective locations at which those values of individual signal strength values were measured. The user equipment 500 may generate a signal strength indicator map based on the data received from the base station. In an example, the user equipment 500 may receive the generated map from the base station 402 or another entity that generated or transmitted the map.

The signal strength indicator map may be transmitted to a user equipment for display by an application installed on the user equipment. The signal strength indicator map may be transmitted to user equipment using short message service (SMS) message or multimedia messaging service (MMS) message. Similarly, data indicative of the signal strength indicator map may be transmitted via SMS message or MMS message to user equipment for display on the user equipment The display signal strength indicator map component 528 provides the instructions for the display of the map. The instructions may be included in the operating system software of the user equipment. The instructions may be included in an application installed on the user equipment. The signal strength indicator map may be displayed on a screen of the user equipment.

Figure 6:
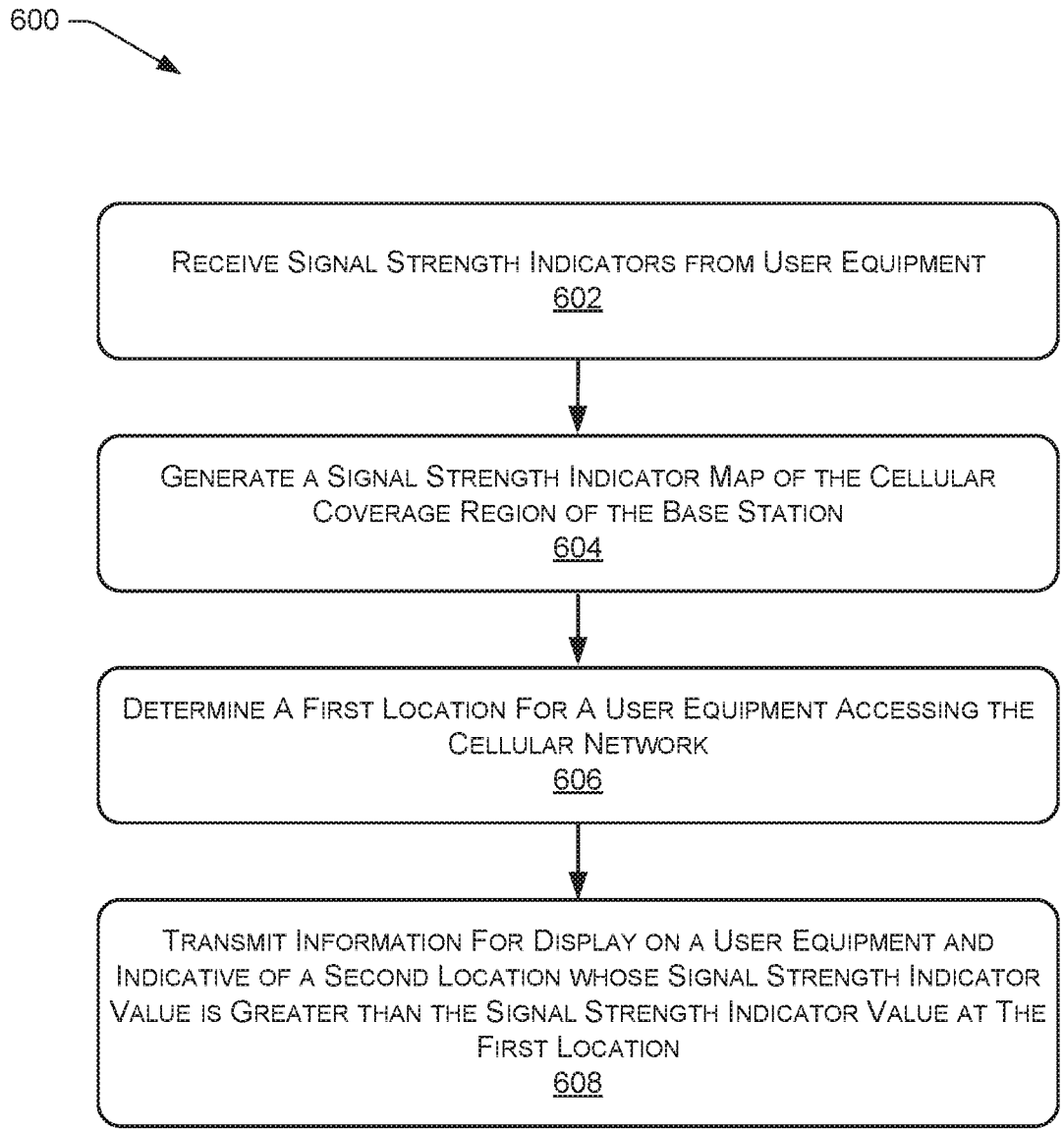
FIG. 6 illustrates an example process performed by a serving base station node according to the disclosed systems and methods.

FIG. 6 is an example process performed by a base station according to the disclosed systems and methods. The process 600 begins at block 602 in which a base station receives signal strength indicator values from one or more user equipment. The signal strength indicator values may be measured RSRP, RSSI, RSRQ, SINR, or other values indicative of the energy or power of the cellular signal. Based on the received signal strength indicator values and the respective locations of the user equipment, the base station may generate a signal strength indicator map of the cellular coverage of the base station at block 604. The location of the user equipment may be determined by the user equipment, by the base station, by another device, or combinations thereof. After generating the signal strength indicator map, the base station may transmit the map to user equipment.

In another example, the base station may determine the location of the user equipment. The base station may also determine if the user equipment is migrating toward an area of reduced signal strength intensity. In one example, the base station monitors the locations of the user equipment. Upon detecting that the user equipment is at a first location (block 606) at which the signal strength indicator is reduced from a second location, the base station in block 608 may transmit information to the user equipment to guide the user equipment to an area having a larger perceived signal strength indicator to enhance the call quality.

Figure 7:
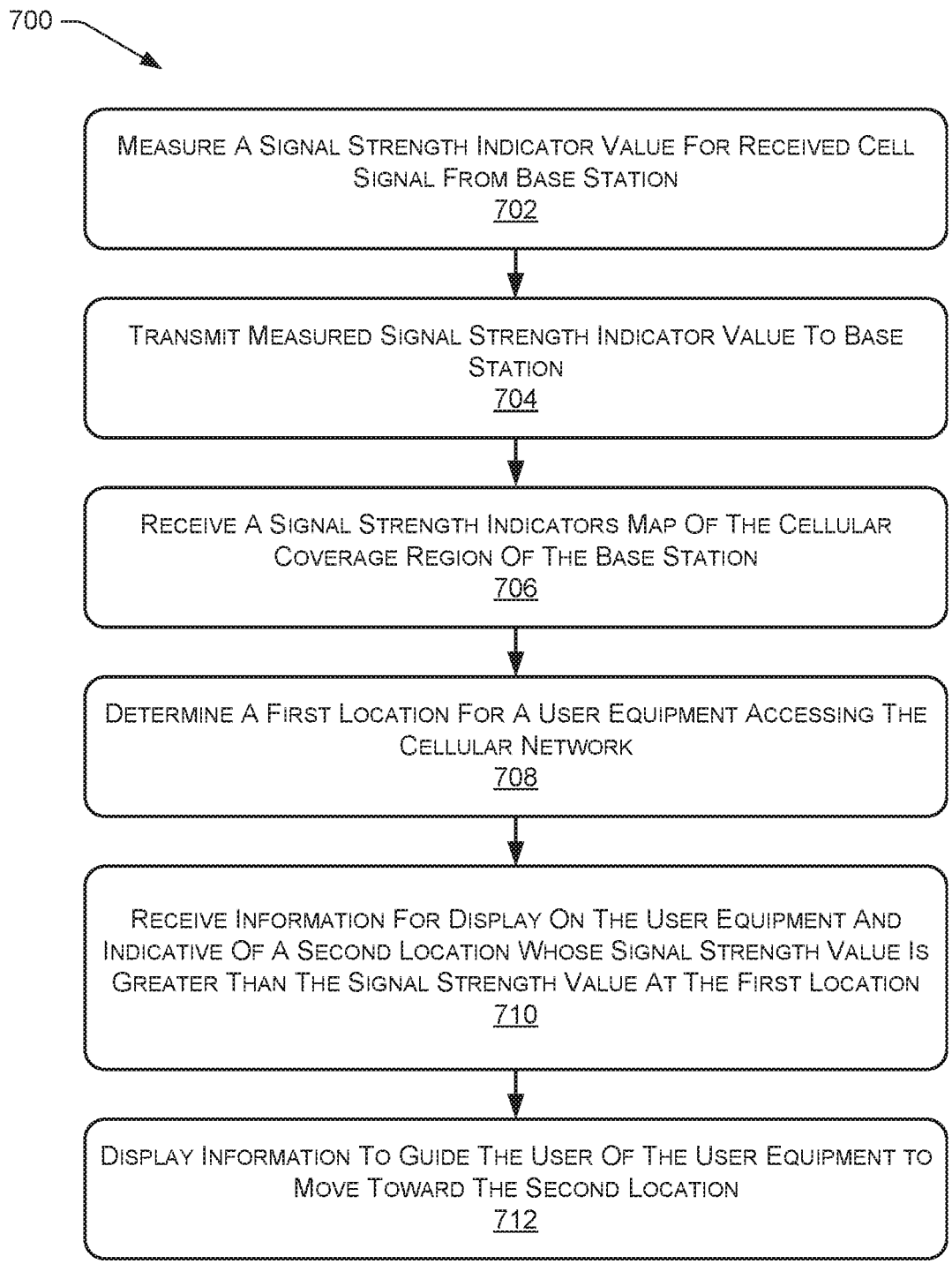
FIG. 7 illustrates an example process performed by a user equipment according to the disclosed systems and methods.

FIG. 7 is an example process performed by a user equipment according to the disclosed systems and methods. FIG. 7 begins at block 702 in which a user equipment receives a cell signal from a base station. The user equipment measures a signal strength indicator value. One example signal strength indicator value is RSRP. Other examples include RSSI and RSRQ. The user equipment transmits its measured signal strength indicator values to the base station at block 704.

The user equipment receives a signal strength indicator map from a base station at block 706. The map is a relationship between the measured signal strength indicator values and the respective locations at which those signal strength indicator values were measured. The map may be in the form of a displayable file such as a JPEG, GIF, PDF, or power point file. The map may also be in the form of tabular data that may be analyzed or displayed.

At block 708 the user equipment determines a current location. As the measured cell signal strength indicator is a function of the strength of the received cell signal. If the measured cell signal strength indicator falls below a predefined threshold for call quality, user equipment should suggest another location for the user to move the user equipment to. At block 710, the user equipment determines a location for which the signal strength indicator value should exceed the signal strength indicator at the current location. Block 710 determines a position that is expected to provide better cell coverage to ensure sufficient call quality for an adequate connection.

At block 712, the user equipment displays information to advise the user to move to a location that is expected to have a better signal strength indicator. In an example, the user equipment may display the second location along with the icon representing the current location of the user equipment. The user equipment may also display directions directing the user to the second location.

The disclosed systems and methods permit user equipment to receive and display a map showing the signal intensities of a cellular signal as a function of geometric location. The user of the user equipment may move to a location identified in the map having a better signal strength to enhance the voice and/or data connection with the user equipment. The user equipment may also include an application that, based on the received coverage map, suggests a location to the user which is expected to have perceived cell signal coverage to enhance the voice and/or data connection with the user equipment.

A signal quality indicator map (or information therein) may be transmitted to a user equipment under various circumstances. For example, the map (or information therein) may be transmitted to user equipment as soon as the base station generates the map. The map may also be transmitted at periodic time intervals. The map (or information therein) may be transmitted upon the base station updating the map. The map (or information therein) may be transmitted to the user equipment upon connection of the user equipment to the base station. In an example, the map may be transmitted to the user equipment when the distance between the user equipment and the base station exceeds a threshold. For example, the user equipment should be provided with the most up-to-date signal quality indicator information when the base station may be entering a region of poor cell coverage. The map may guide the user to a region having a better signal quality to enhance the voice or data communication.

Figure 8:
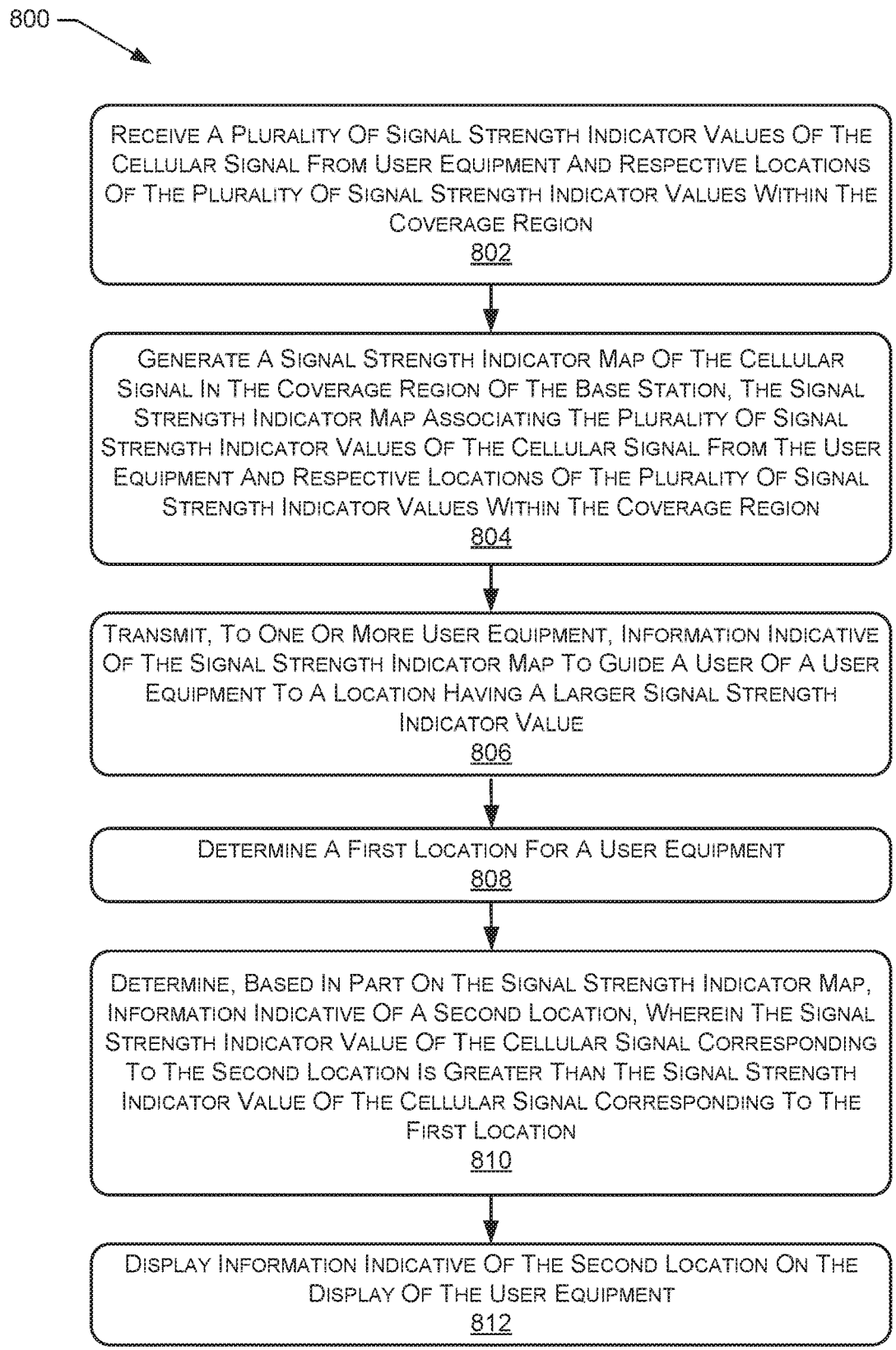
FIG. 8 illustrates an example process for generating and using a signal strength indicator map.

FIG. 8 is an example process 800 for generating and using a signal strength indicator map. The process 800 begins at block 802, in which the base station receives a plurality of signal strength indicator values from one or more user equipment. The received signal strength indicator values are measurements of the received cellular signal from respective user equipment at respective locations. The measured signal strength indicator values may be paired with respective locations of the user equipment when measuring the signal strength indicator values. By collecting measured signal strength indicator values from user equipment at various locations in the coverage area of a base station, a map of the perceived signal strength of the cellular signal within the coverage region of the base station may be created. The plurality of signal strength indicator values may be received by the base station as part of measurement reports transmitted from user equipment to the base station. The signal strength indicator value may be a measured RSRP value. In an example, the signal strength indicator value may be a measured RSSI value. The signal strength indicator value may also be a measured RSRQ value. In an example, the signal strength indicator value may be a combination of two or more of an RSRP value, an RSSI value, and a RSRQ value.

The base station may also receive the respective locations of the user equipment when making the signal strength indicator value measurement. In an example, the base station, rather than the user equipment may determine the respective locations of the user equipment when making the signal strength indicator value measurement.

Once the base station receives the signal strength indicator values and the respective locations of the user equipment when making the measurements, the base station may generate a signal strength indicator value map at block 804. The signal strength indicator map provides information at locations within the coverage region of the base station about the measured signal strengths of the cellular signal transmitted by the base station. In one example, the signal strength indicator map may be a table in which the rows include measured signal strength indicator values and respective locations at which the signal strength indicator values were measured. In an example, the table may also include the respective frequency or frequency range for the user equipment that preformed the measurement of the signal strength indicator value.

At block 806, information the signal strength indicator value map may be transmitted to one or more user equipment. The map may be transmitted in the form of a table (discussed above). A map may also be transmitted as a portion of the table. The map may be transmitted as a file such as a PDF of the map.

At block 808, the location of a user equipment is determined. In one example, the user equipment determines it location. A user equipment may determine its location using Global Positioning System (GPS) methods. A user equipment may determine its location using an Observed Time Difference of Arrival (OTDOA) method. A user equipment may also determine its location via analyzing nearby WiFi access points or cellular access points. In an example, a base station may also receive location feedback from the user equipment in the background as the user equipment may leverage its communication with an operating system application server platform and the user equipment's internal GPS sensing mechanism to better resolve the location of the subscriber. This may be sent to base station through standard 3GPP air interface protocols between the user equipment and the base station.

At block 810, a second location is determined at which the perceived signal strength of the cellular signal is greater than the perceived signal strength of the cellular signal at the location of the user equipment. In one example, a map of the perceived signal strengths of the cellular signal is displayed on a display of the user equipment at block 812. The map may also display the current location of the user equipment (using an icon) and the indications of the perceived signal strength indicator values surrounding the current location of the user equipment. Using the signal strength indicator map, the user may navigate to a region having a higher perceived signal strength indicator compared to the perceived signal strength indicator of the current location. In an example, the user equipment may determine the second location, and display the second location on the signal strength indicator map on the display of the user equipment. The user equipment may also display directions navigating the user from the first location to the second location. In an example, the base station may generate the second location and send the second location information to the user equipment. In this example, the base may also transmit directions to the user equipment guiding the user from the first location to the second location having a better signal quality for voice or data communication.

Figure 9:
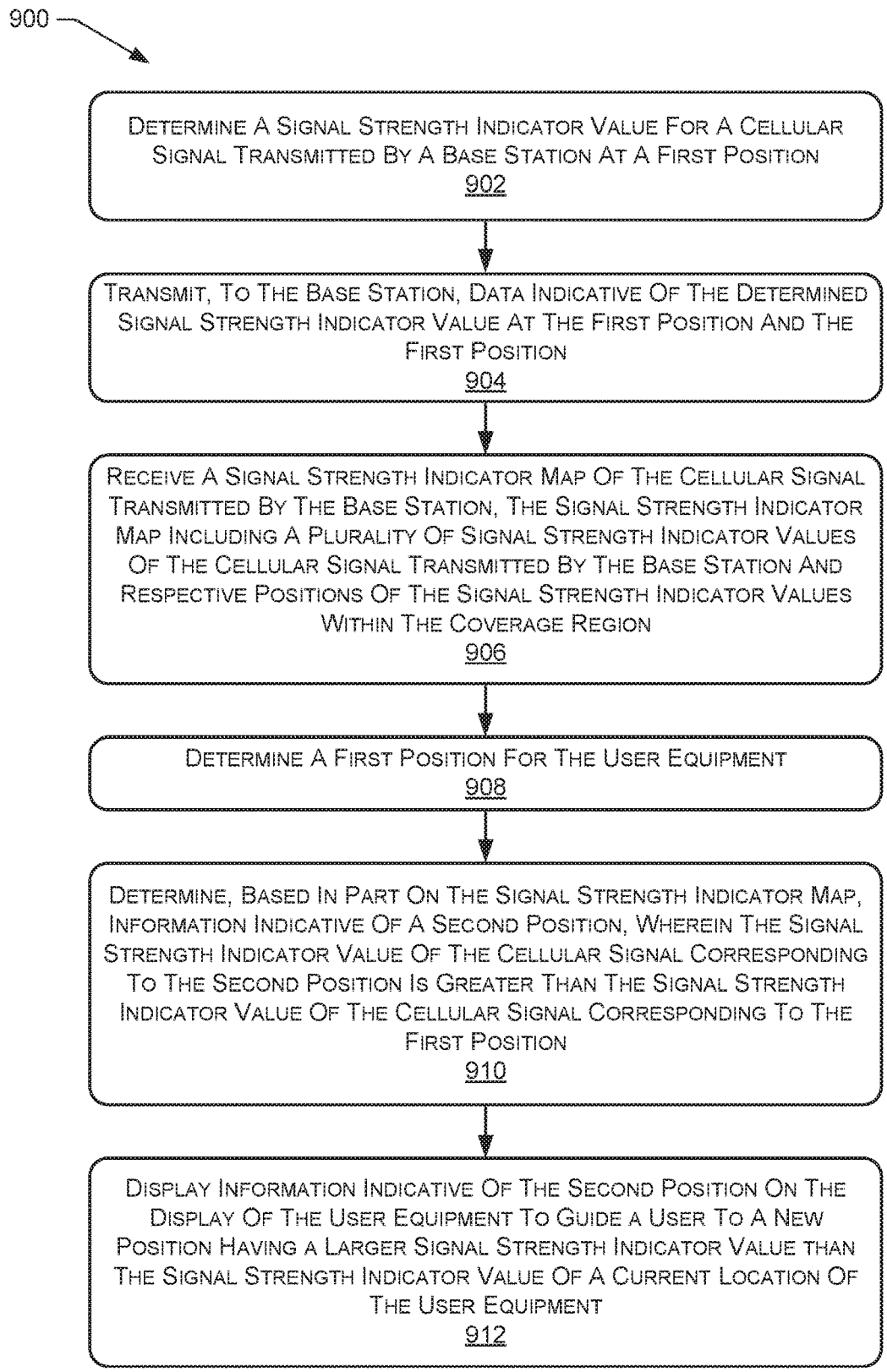
FIG. 9 illustrates an example process performed by a user equipment according to the disclosed systems and methods.

FIG. 9 is an example process 900 performed by a user equipment according to the disclosed systems and methods. Process 900 begins at block 902 in which the user equipment determines a signal strength indicator value for a cellular signal transmitted by a base station. The user equipment may measure an RSRP, RSSI, RSRQ, or combinations of these parameters as a signal strength indicator value. In other examples, the user equipment may measure other signal parameters such as power or quality to determine a signal strength indicator value. The user equipment also determines its position at which the user equipment measured the signal strength indicator value.

At block 904, the user equipment transmits data indicative of the measured signal strength indicator value at the first position to the base station. In one example, the user equipment transmits the signal strength indicator value to the base station. In another example, the user equipment transmits to the base station a processed or filtered version of the measured signal strength indicator value. The user equipment may also transmit to the base station the position at which the user equipment took the measurement of the signal strength indicator value.

At block 906, the user equipment receives data indicative of the signal strength indicator map. In one example, the user equipment receives a table that associates perceived signal strength quality indicator values with positions around the base station. This table identifies the perceived signal strength indicator values within the coverage region of the base station. In an example, the user equipment receives a file, such as a PDF or Visio file, that may be displayed on a display screen of the user equipment.

At block 908, the user equipment determines its current or first position. The user equipment can determine its current position using any of the position determining methods discussed previously. In an example, the base station, rather than the user equipment may determine the current position of the user equipment.

At block 910, the user equipment determines a second position such that perceived signal strength at the second position is greater than the perceived signal strength at the first position. In one example, the user equipment displays at block 912 the signal strength indicator map on a display screen of the user equipment. The current position of the user equipment may also be displayed using an icon. Based upon the displayed signal strength indicator map, a user of the user equipment may select a second position at which the perceived signal strength of the cellular signal at the second position is greater than the perceived signal strength at the first position. In this fashion, the signal strength indicator map may guide a user to a position having a greater perceived signal strength indicator value, and thus maintain or enhance the quality of the voice or data communication. In another example, the base station may transmit information about the second position to the user equipment. In this fashion, the base station may guide the user equipment as to a position for better communication quality.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method of determining signal strength indicator values of a cellular signal used by user equipment to communicate with a base station in a coverage region of the base station, the method comprising:
   receiving a plurality of signal strength indicator values of the cellular signal from the user equipment and respective locations of the plurality of signal strength indicator values within the coverage region of the base station;
   generating a signal strength indicator map of the cellular signal in the coverage region of the base station, the signal strength indicator map associating the plurality of signal strength indicator values of the cellular signal from the user equipment and the respective locations of the plurality of signal strength indicator values within the coverage region, wherein the signal strength indicator map includes a first frequency range associated with a first signal strength indicator value of the plurality of signal strength indicator values of the cellular signal and the respective location of the first signal strength indicator value and a second frequency range associated with a second signal strength indicator value of the plurality of signal strength indicator values of the cellular signal and the respective location of the second signal strength indicator value;
   determining, for a particular user equipment, information indicative of the signal strength indicator map to guide a user of the particular user equipment to a new location having a larger signal strength indicator value than a signal strength indicator value measured at a current location of the particular user equipment, the information indicative of the signal strength indicator map being determined based on frequency-specific variations in the signal strength indicator map for a particular frequency used by the particular user equipment to communicate with the base station; and
   transmitting, to the particular user equipment, the information indicative of the signal strength indicator map.

2. The method of claim 1, wherein the determining, for the particular user equipment, the information indicative of the signal strength indicator map comprises:
   determining a first location of the particular user equipment; and
   determining, based in part on the signal strength indicator map, information indicative of a second location, wherein a signal strength indicator value of the cellular signal corresponding to the second location is greater than a signal strength indicator value of the cellular signal corresponding to the first location.

3. The method of claim 2, further comprising displaying the information indicative of the second location on a display of the particular user equipment.

4. The method of claim 2, further comprising sending an instruction to the particular user equipment to move to the second location.

5. The method of claim 1, wherein transmitting the information indicative of the signal strength indicator map includes transmitting a short message service (SMS) message, a multimedia messaging service (MMS) message, or a file to be displayed.

6. The method of claim 1, further comprising:
updating the signal strength indicator map of the cellular signal in the coverage region of the base station, wherein updating includes adding one or more additional signal strength indicator values of the cellular signal from another user equipment and the respective locations of the one or more additional signal strength indicator values within the coverage region.

7. The method of claim 1, wherein at least one of the plurality of signal strength indicator values is one of a reference signal received power (RSRP), received signal strength indication (RSSI), or reference signal received quality (RSRQ).

8. A system for generating a signal strength indicator map of a cellular signal used by user equipment to communicate with a base station in a coverage region of the base station, the system comprising:
one or more processors; and
a memory storing computer instructions that when executed cause the one or more processors to perform acts comprising:
receiving a plurality of signal strength indicator values of the cellular signal from the user equipment and respective locations of the plurality of signal strength indicator values of the cellular signal;
generating a signal strength indicator map of the cellular signal in the coverage region of the base station, the signal strength indicator map associating the plurality of signal strength indicator values of the cellular signal from the user equipment and respective locations of the plurality of signal strength indicator values within the coverage region, wherein the signal strength indicator map includes a first frequency range associated with a first signal strength indicator value of the plurality of signal strength indicator values of the cellular signal and the respective location of the first signal strength indicator value and a second frequency range associated with a second signal strength indicator value of the plurality of signal strength indicator values of the cellular signal and the respective location of the second signal strength indicator value;
determining, for a particular user equipment, information indicative of the signal strength indicator map to guide a user of the particular user equipment to a new location having a larger signal strength indicator value than a signal strength indicator value measured at a current location of the particular user equipment, the information indicative of the signal strength indicator map being determined based on frequency-specific variations in the signal strength indicator map for a particular frequency used by the particular user equipment to communicate with the base station; and
transmitting, to the particular user equipment, the information indicative of the signal strength indicator map.

9. The system of claim 8, wherein at least one of the respective locations of the plurality of signal strength indicator values within the coverage region were received from the user equipment from which the plurality of signal strength indicator values were received.

10. The system of claim 8, wherein the acts further comprise determining at least one of the respective locations of the plurality of signal strength indicator values within the coverage region.

11. The system of claim 8, wherein at least one of the respective locations of the plurality of signal strength indicator values within the coverage region is determined, in part, by a Global Positioning System (GPS), Observed Time Difference of Arrival (OTDOA), or timing advance information.

12. The system of claim 8, wherein at least one of the plurality of signal strength indicator values is one of a received signal received power (RSRP), reference signal strength indication (RSSI), or reference signal received quality (RSRQ).

13. The system of claim 8, the signal strength indicator map comprises a table.

14. The system of claim 8, wherein transmitting the information indicative of the signal strength indicator map includes transmitting a short message service (SMS) message, a multimedia message service (MMS) message, or a file to be displayed.

15. A user equipment for identifying signal strength indicator values of a cellular signal transmitted by a base station within a coverage region, the base station coupled to a cellular network, the user equipment comprising:
one or more processors;
a display; and
a memory storing computer instructions that when executed cause the one or more processors to perform acts comprising:
determining a signal strength indicator value for a cellular signal transmitted by the base station at a first position;
transmitting, to the base station, data indicative of the signal strength indicator value at the first position; and
receiving a signal strength indicator map of the cellular signal transmitted by the base station, the signal strength indicator map including a plurality of signal strength indicator values of the cellular signal transmitted by the base station and respective positions of the signal strength indicator values within the coverage region, wherein the signal strength indicator map includes a first frequency range associated with a first signal strength indicator value of the plurality of signal strength indicator values of the cellular signal and the respective position of the first signal strength indicator value and a second frequency range associated with a second signal strength indicator value of the plurality of signal strength indicator values of the cellular signal and the respective position of the second signal strength indicator value; and
determining, for the user equipment, information indicative of the signal strength indicator map to guide a user of the user equipment to a new location having a larger signal strength indicator value than a signal strength indicator value measured at a current location of the user equipment, the information indicative of the signal strength indicator map being determined based on frequency-specific variations in the signal strength indicator map for a particular frequency used by the user equipment to communicate with the base station.

16. The user equipment of claim 15, wherein the determining the information indicative of the signal strength indicator map to guide the user of the user equipment to the new location comprises:
determining a first position for the user equipment; and
determining, based in part on the signal strength indicator map, information indicative of a second position, wherein the signal strength indicator value of the cellular signal in the coverage region corresponding to the second position is greater than the signal strength indicator value of the cellular signal in the coverage region corresponding to the first position.

17. The user equipment of claim 16, wherein the acts further comprise: displaying, on the display, information indicative of directing a user of the user equipment to move toward the second position to guide a user of the user equipment to a new location having a larger signal strength indicator value than the signal strength indicator value measured at a current location of the user equipment.

18. The user equipment of claim 16, wherein the acts further comprise: displaying, on the display, a map depicting the second position, directions to the second position, or a coordinate defining the second position.

19. The user equipment of claim 15, wherein at least one of the plurality of signal strength indicator values is one of a received signal received power (RSRP), reference signal strength indication (RSSI), or reference signal received quality (RSRQ).

* * * * *